United States Patent
He et al.

(10) Patent No.: US 10,165,561 B2
(45) Date of Patent: Dec. 25, 2018

(54) COMMUNICATIONS DEVICE AND METHOD FOR RESOURCE ALLOCATION

(71) Applicant: Huawei Technologies Co., Ltd., Shenzhen (CN)

(72) Inventors: Jia He, Chengdu (CN); Minghui Xu, Chengdu (CN); Ziming Yu, Chengdu (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 42 days.

(21) Appl. No.: 15/413,661

(22) Filed: Jan. 24, 2017

(65) Prior Publication Data

US 2017/0135081 A1 May 11, 2017

Related U.S. Application Data

(63) Continuation of application No. PCT/CN2014/083064, filed on Jul. 25, 2014.

(51) Int. Cl.
  *H04W 72/04* (2009.01)

(52) U.S. Cl.
  CPC ......... *H04W 72/042* (2013.01); *H04W 72/04* (2013.01); *H04W 72/0446* (2013.01); *H04W 72/0493* (2013.01)

(58) Field of Classification Search
  None
  See application file for complete search history.

(56) References Cited

U.S. PATENT DOCUMENTS

| | | | |
|---|---|---|---|
| 2004/0002363 A1* | 1/2004 | Cuffaro | H04B 7/04 455/562.1 |
| 2010/0290549 A1* | 11/2010 | Yang | H04B 7/0617 375/260 |

(Continued)

FOREIGN PATENT DOCUMENTS

| | | |
|---|---|---|
| CN | 1781268 A | 5/2006 |
| CN | 101034925 A | 9/2007 |

(Continued)

OTHER PUBLICATIONS

Chang, L., et al., "A Novel Multiple Access Protocol for a Wireless Local Area Network to Effectively Support a Smart Antenna," Journal of Xidian University, vol. 33, No. 2, Apr. 2006, 6 pages.

(Continued)

*Primary Examiner* — Hicham B Foud
(74) *Attorney, Agent, or Firm* — Slater Matsil, LLP

(57) ABSTRACT

Embodiments provide a communications device for resource allocation, including: a determining module, configured to acquire, from an S region corresponding to each beam, each beam ID fed back by user equipment, determine each T region including user equipment according to the beam ID, and determine a quantity of user equipments included in each T region; a calculation module, configured to select, according to a preset rule, to-be-connected user equipment from the user equipment included in each T region, and calculate, according to a resource allocation policy, a ratio of resources to be allocated to each to-be-connected user equipment; and an allocation module, configured to allocate, in a preset allocation manner according to the resource ratio, a resource to be allocated to each user equipment to the user equipment, and send PDCCH information to the user equipment to deliver the resource allocated to the user equipment to the user equipment.

15 Claims, 6 Drawing Sheets

(56) References Cited

U.S. PATENT DOCUMENTS

| | | | |
|---|---|---|---|
| 2011/0243074 A1 | 10/2011 | Shin et al. | |
| 2013/0286960 A1 | 10/2013 | Li et al. | |
| 2014/0073337 A1* | 3/2014 | Hong | H04W 16/28 455/452.1 |
| 2015/0215086 A1 | 7/2015 | Nakao et al. | |
| 2016/0197659 A1* | 7/2016 | Yu | H04W 16/28 370/335 |
| 2017/0142701 A1 | 5/2017 | Nishio et al. | |
| 2018/0146461 A1 | 5/2018 | Nogami et al. | |

FOREIGN PATENT DOCUMENTS

| | | |
|---|---|---|
| CN | 103004272 A | 3/2013 |
| CN | 103081386 A | 5/2013 |
| CN | 103493578 A | 1/2014 |

OTHER PUBLICATIONS

Huawei, et al., "Resource Allocation for D2D Synchronization Signals," 3GPP TSG RAN WG1 Meeting #77, R1-141919, Seoul, Korea, May 19-23, 2014, 4 pages.

\* cited by examiner

COMMUNICATIONS DEVICE AND METHOD FOR RESOURCE ALLOCATION

CROSS-REFERENCE TO RELATED APPLICATIONS

This application is a continuation of International Application No. PCT/CN2014/083064, filed on Jul. 25, 2014, the disclosure of which is hereby incorporated by reference in its entirety.

TECHNICAL FIELD

The present invention relates to the field of communications technologies, and in particular, to a communications device and a method for resource allocation.

BACKGROUND

As mobile terminals increase, a demand of a user for a data volume increases. Currently, bandwidth provided for a lower frequency band is inadequate to meet ever growing demands for communication performance. Therefore, using high frequencies (30 G to 300 G or higher) having abundant bandwidth resources as a backhaul frequency and an access frequency will become a trend. Compared with the lower frequency band, a high frequency has one significant feature, a large path loss. To ensure a certain propagation distance, a beam at the high frequency needs to be relatively narrow. If a high-frequency narrow beam is used to implement full-range coverage (base station signal coverage), in the prior art, full-range time-division coverage (that is, signal scanning) is implemented as multiple users access a network in a time division manner by using a single beam. When there are a large quantity of users evenly distributed within a coverage area (for example, a cell), an implementation manner in the prior art makes a waiting time for each user relatively long, and user experience of full coverage is poor. A solution in the prior art is high in implementation costs and poor in user experience. Further, when the foregoing solution is used to implement resource allocation, resources are allocated between mobile terminals in units of timeslots (TTIs) in a time domain. When a beam is relatively narrow and a quantity of users is relatively large, and when resources are allocated in units of TTIs in the prior art, a waiting time for a mobile terminal is relatively long, and user experience in resource allocation is poor

SUMMARY

Embodiments of the present invention provide a communications device and a method for resource allocation, so that a beam ID acquired by each single beam may be received while multi-beam scanning is supported, to-be-connected user equipment may be selected, and a ratio of resources to be allocated to user equipment may be calculated according to a preset allocation policy, so as to allocate the resources to the user equipment, thereby improving flexibility and efficiency of resource allocation and enhancing user experience in resource allocation.

A first aspect of the embodiments of the present invention provides a communications device for resource allocation. The device may include: a determining module, configured to acquire, from a space S region corresponding to each beam in a cell, each beam identity ID fed back by user equipment, determine each time T region including user equipment(s) according to the beam ID, and determine a quantity of user equipment(s) included in each T region. The device may also includes a calculation module, configured to select, according to a preset rule, to-be-connected user equipment(s) from the user equipment(s) included in each T region, and calculate, according to a preset resource allocation policy, a ratio of resources to be allocated to each to-be-connected user equipment. The device may also includes an allocation module, configured to allocate, in a preset allocation manner according to the resource ratio, a resource to be allocated to each user equipment to the user equipment(s), and send physical downlink control channel PDCCH information to the user equipment(s) to deliver the resource allocated to the user equipment(s) to the user equipment(s).

A second aspect of the embodiments of the present invention provides a base station. The base station may include: a receiver, configured to acquire, from a space S region corresponding to each beam in a cell, each beam identity ID fed back by user equipment; a processor, configured to determine each time T region including a user equipment(s) according to the beam ID acquired by the receiver, and determine a quantity of user equipments included in each T region. The processor is further configured to select, according to a preset rule, to-be-connected user equipment from the user equipment included in each T region, and calculate, according to a preset resource allocation policy, a ratio of resources to be allocated to each to-be-connected user equipment. The processor is further configured to allocate, in a preset allocation manner according to the resource ratio, a resource to be allocated to each user equipment to the user equipment; and a transmitter, configured to send physical downlink control channel PDCCH information to the user equipment selected by the processor to deliver the resource allocated to the user equipment to the user equipment.

With reference to the second aspect, in a first possible implementation manner, the processor is further configured to: divide a to-be-scanned sector in the cell into multiple S regions, and divide each S region into at least one T region; and the transmitter is further configured to: for each S region, poll all T regions in the S region in a time division manner by using a single beam, to cover each T region in the S region, and the receiver receives a beam ID fed back by the user equipment in the T region, where each T region corresponds to one beam ID.

A third aspect of the embodiments of the present invention provides a method for resource allocation. The method may include: acquiring, by a base station from a space S region corresponding to each beam in a cell, each beam identity ID fed back by user equipment, determining each time T region including a user equipment(s) according to the beam ID, and determining a quantity of user equipments included in each T region. The method may also includes selecting, by the base station according to a preset rule, to-be-connected user equipment from the user equipment included in each T region, and calculating, according to a preset resource allocation policy, a ratio of resources to be allocated to each to-be-connected user equipment. The method may also include allocating, by the base station in a preset allocation manner according to the resource ratio, a resource to be allocated to each user equipment to the user equipment(s), and sending physical downlink control channel PDCCH information to the user equipment(s) to deliver the resource allocated to the user equipment(s) to the user equipment(s).

In the embodiments of the present invention, a communications device may receive a beam ID fed back by user equipment, and determine locations and a quantity of user equipments according to the received beam ID; further calculate, according to a preset resource allocation policy, a ratio of resources to be allocated to each user equipment; then, allocate a resource to the user equipment in a preset allocation manner; and send PDCCH information to the user equipment to deliver the resource allocated to the user equipment to the user equipment. That is, in the embodiments of the present invention, a beam ID acquired by each single beam may be received while multi-beam scanning is supported, to-be-connected user equipment may be selected according to a preset rule, and a ratio of resources to be allocated to the user equipment may be further calculated according to a preset allocation policy, so that the resource is allocated to the user equipment in the preset allocation manner, thereby improving flexibility and efficiency of resource allocation and enhancing user experience in resource allocation

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention.

In specific implementation, a communications device for resource allocation described in the embodiments of the present invention may be specifically a base station, or a device applied to a base station. The communications device for resource allocation provided in the embodiments of the present invention is specifically described in the following embodiments by using a base station as an example.

Figure 1:
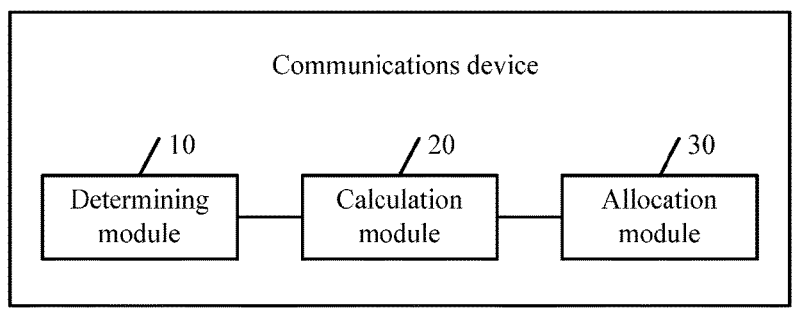
FIG. 1 is a schematic structural diagram of a first embodiment of a communications device for resource allocation according to the embodiments of the present invention.

Refer to FIG. 1, which is a schematic structural diagram of a first embodiment of a communications device for resource allocation according to the embodiments of the present invention. The communications device described in this embodiment includes: a determining module 10, configured to acquire, from a space S region corresponding to each beam in a cell, each beam identity ID fed back by user equipment, determine each time T region including user equipment according to the beam ID, and determine a quantity of user equipments included in each T region; a calculation module 20, configured to select, according to a preset rule, to-be-connected user equipment from the user equipment included in each T region, and calculate, according to a preset resource allocation policy, a ratio of resources to be allocated to each to-be-connected user equipment; and an allocation module 30, configured to allocate, in a preset allocation manner according to the resource ratio, a resource to be allocated to each user equipment to the user equipment, and send physical downlink control channel PDCCH information to the user equipment to deliver the resource allocated to the user equipment to the user equipment.

In specific implementation, the user equipment described in this embodiment of the present invention may be specifically a mobile terminal on a mobile station (MS) side, that is, a mobile terminal in a cell covered by a base station signal. The user equipment described in this embodiment of the present invention may emit a narrow beam for scanning, to align with a beam emitted by a base station, and receive a beam signal sent by the base station. When the beam emitted by the user equipment is completely aligned with the beam emitted by the base station, power of a signal received by the user equipment is the strongest, so that information such as a synchronization sequence may be acquired from the beam signal transmitted by the base station.

Figure 2:
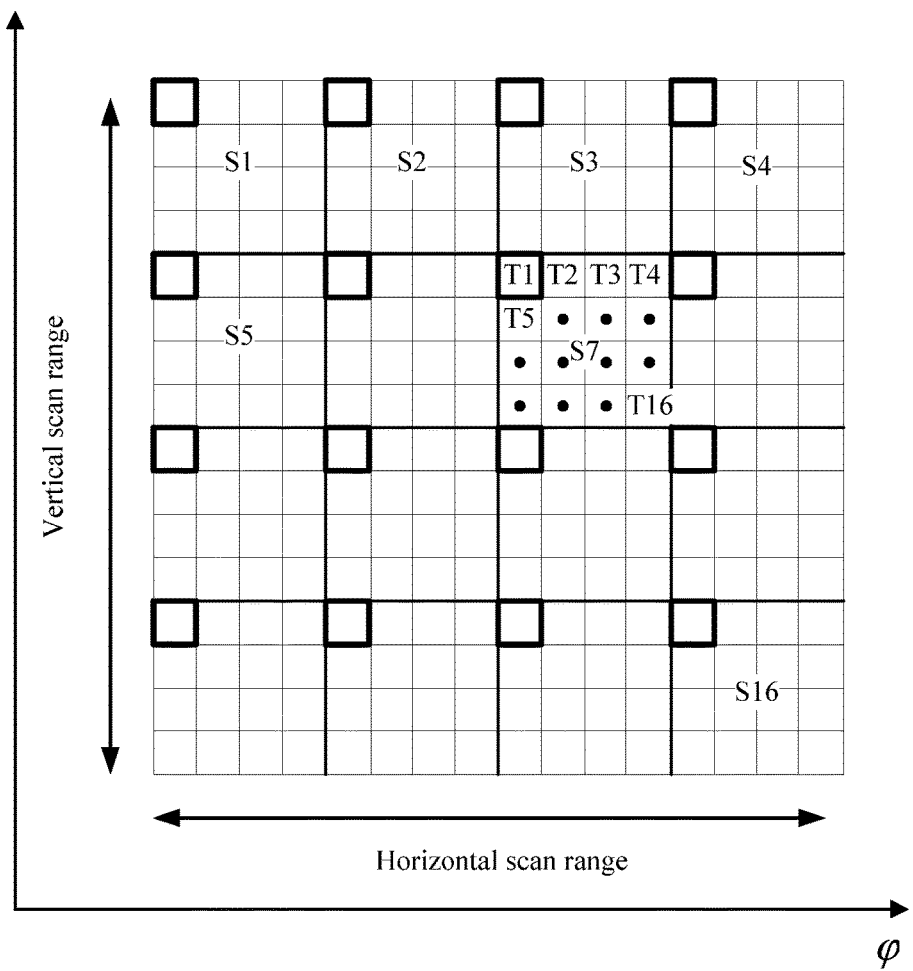
FIG. 2 is a schematic diagram of cell division in a first embodiment of a communications device for resource allocation according to the embodiments of the present invention.

In some feasible implementation manners, the communications device (a base station is used as an example in the following embodiment) for resource allocation provided in this embodiment of the present invention may implement cell-wide coverage (signal coverage) in wavelength division and space division manners on a network on which a beam is limited and a width of the beam is relatively narrow. In this embodiment of the present invention, the base station may implement cell-wide coverage (signal scanning) for each space region (S region for short) in a single beam scanning manner while implementing cell-wide coverage by using multiple beams. That is, the base station may cover multiple S regions by using multiple beams, where each beam corresponds to one S region, and in each S region, each time region (T region for short) in the S region may be polled in a time division manner by using a single beam. That is, each single beam that covers the S region may point to a different T region in the S region according to a different time point, so as to implement cell-wide coverage. Specifically, the base station may first divide a to-be-scanned sector in the cell into multiple S regions, and divide each S region into multiple T regions (that is, at least one T region), as shown in FIG. 2. For each S region, the base station polls all T regions in the S region in a time division manner by using a single beam, to cover each T region, so that coverage for each S region is implemented by covering each T region, then coverage for the sector is implemented by covering each S region, and finally, cell-wide coverage is implemented by covering each sector. After dividing each sector in the cell covered by the base station into multiple S regions and dividing each S region into multiple T regions, the base station may cover (that is, perform signal scanning on) all S regions by using multiple beams emitted by the base station, where one beam corresponds to one S region, so as to implement coverage for the T regions in the S region by using a single beam, and send information such as a synchronization sequence to user equipment in the T region. The user equipment in the T region may perform scanning by using a beam emitted by the user equipment, align with the beam emitted by the base station, and acquire the information such as the synchronization sequence from the beam signal sent by the base station, so as to select a serving beam for the user equipment according to the information such as the synchronization sequence, and feed back information such as a sequence of the serving beam to the base station. The determining module 10 of the base station may perform scanning by using the beam emitted by the base station, and receive the information such as the sequence fed back by the user equipment in each T region, so as to acquire, from the information such as the sequence, a beam identity (ID) (that is, an ID of the serving beam) fed back by the user equipment. In specific implementation, each T region corresponds to one beam ID, and the base station may determine, according to the beam ID fed back by each user equipment, a T region in which each user equipment is located.

In some feasible implementation manners, after acquiring, from each T region in the S region corresponding to each beam, the beam ID fed back by the user equipment, the determining module 10 may determine the T region including the user equipment according to the beam ID, so as to determine the quantity of user equipments included in each T region. Specifically, the base station polls all T regions in a time division manner by using the single beam. That is, each single beam points to a different T region according to a different time point. For example, the beam points to an $N^{th}$ T region at a Tn time point. Therefore, when the determining module 10 acquires the beam ID fed back by the user equipment, the determining module 10 may determine, according to a time (or a specific time point) at which the beam ID is acquired, a T region in which the user equipment that feeds back the beam ID is located. After determining a location (that is, a T region in which each user equipment is located) of each user equipment according to the beam ID fed back by the user equipment, the determining module 10 may further determine the quantity of user equipments included in each T region according to a user equipment ID fed back by the user equipment. Specifically, the user equipment also feeds back the user equipment ID when feeding back the beam ID, and the determining module 10 may distinguish different user equipments by identifying user equipment IDs in each T region, so as to determine a quantity of user equipments in a current T region. The user equipment ID may include a globally unique user equipment ID (that is, an ID allocated by a system to the user equipment when the user equipment accesses a communications network, and a globally unique ID) or a cell identifier (cell-radio Network Temporary Identifier, c-RNTI).

In some feasible implementation manners, after the determining module 10 determines a T region in which each user equipment is located and the quantity of user equipments in each T region, the calculation module 20 may select one or more user equipments from the user equipment included in each T region as to-be-connected user equipment according to the preset rule. Specifically, when the T region includes only one user equipment, the calculation module 20 may select the user equipment as the to-be-connected user equipment corresponding to the T region; or when the T region includes multiple user equipments, the calculation module 20 may select, according to the preset rule, one or more user equipments from the multiple user equipments as the to-be-connected user equipment corresponding to the T region, so as to determine a total quantity of to-be-connected user equipments included in all T regions, that is, a total quantity of user equipments included in each S region. After the determining module 10 determines information such as the quantity of user equipments included in each T region, the quantity of user equipments included in each S region, and a T region in which each user equipment is located, the calculation module 20 may calculate, according to the preset resource allocation policy, a resource to be allocated to each user equipment (that is, the ratio of resources to be allocated to each user equipment). For example, the calculation module 20 may calculate, according to a preset resource allocation policy between the S regions, a ratio (or referred to as a resource ratio) of resources to be allocated to user equipments included in each S region; or calculate, according to a preset resource allocation policy of the T regions in the S region, a ratio of resources to be allocated to user equipments included in all T regions in one S region.

In some feasible implementation manners, after the calculation module 20 calculates, according to the preset resource allocation policy, the ratio of resources to be allocated to each user equipment, the allocation module 30 may allocate the resources to the user equipment. Specifically, the allocation module 30 may allocate a resource to be allocated to each user equipment to the user equipment in the preset allocation manner according to the resource ratio obtained through calculation, and send the physical downlink control channel (PDCCH) information to the user equipment to deliver the resource allocated to the user equipment to the user equipment. In specific implementation, the PDCCH information is used to indicate information about the resource of the scheduled user equipment, and after receiving the resource delivered by the base station and the PDCCH information, the user equipment may parse out the information about the resource of the user equipment according to the PDCCH information. In an existing LTE technology, resource information of all terminals (that is, user equipments) is allocated on the first three symbols of a subframe, resource information of different user equipments is distinguished by using a frequency, and before scheduling, the base station may broadcast PDCCH information of all the user equipments to all the user equipments in a manner such as broadcasting. In an application scenario provided in this embodiment of the present invention, because the beam emitted by the base station is a high-frequency narrow beam, and a width of the beam is relatively narrow, when the beam emitted by the base station points to one region (such as a Tn region in an Si region), user equipment in another region (such as another T region in the Si region) cannot receive information, including the PDCCH information, transmitted by the base station. In the application scenario provided in this embodiment of the present invention, to enable user equipment in each T region to receive the PDCCH information transmitted by the base station, the PDCCH information needs to be delivered separately. That is, when the beam emitted by the base station is switched from a region Tij to a region Tik (j is unequal to k), the allocation module 30 needs to send only PDCCH information of user equipment included in the current region Tik, so that the user equipment in each T region may receive PDCCH information corresponding to the user equipment, so as to parse out resource information of the user equipment according to the PDCCH information corresponding to the user equipment.

In this embodiment of the present invention, in an application scenario in which a base station implements cell-wide coverage by using a high-frequency narrow beam, the base station may determine, according to a beam ID fed back by user equipment in each T region, user equipment included in each T region and locations and a quantity of user equipments included in an S region; select to-be-connected user equipment from the user equipment included in each T region; then calculate, according to a preset resource allocation policy, a ratio of resources to be allocated to each user equipment; and send PDCCH information to the user equipment to deliver a resource to be allocated to the user equipment to the user equipment. The communications device for resource allocation provided in this embodiment of the present invention may support resource allocation in an implementation manner in which the base station implements cell-wide coverage by using the high-frequency narrow beam, thereby improving flexibility of resource allocation and efficiency of resource allocation, and enhancing user experience in resource allocation.

Figures 3, 4:
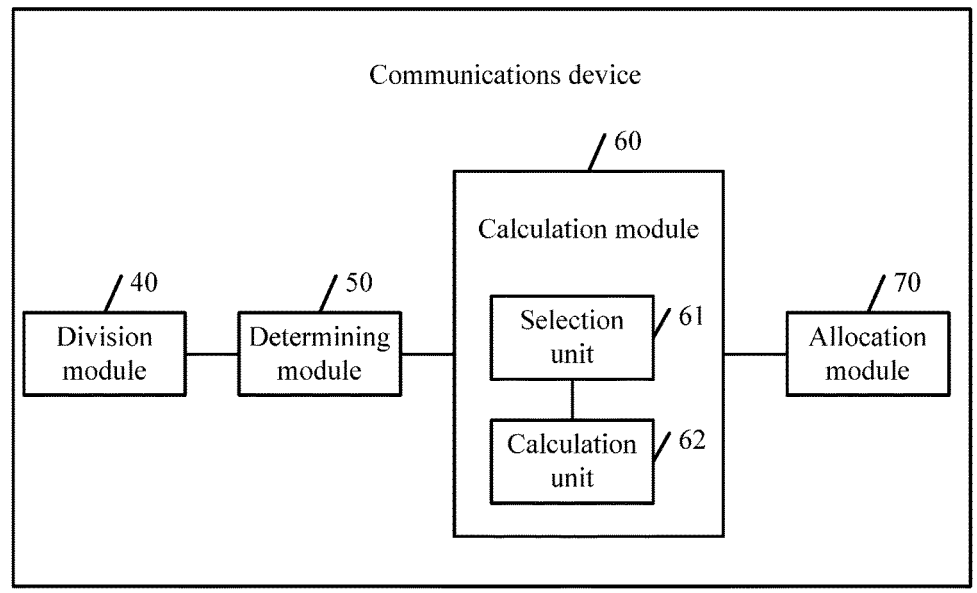
FIG. 3 is a schematic structural diagram of a second embodiment of a communications device for resource allocation according to the embodiments of the present invention.
FIG. 4 is a schematic diagram of user distribution in a second embodiment of a communications device for resource allocation according to the embodiments of the present invention.

Refer to FIG. 3, which is a schematic structural diagram of a second embodiment of a communications device for resource allocation according to the embodiments of the present invention. The communications device described in this embodiment includes: a determining module 50, configured to acquire, from a space S region corresponding to each beam in a cell, each beam identity ID fed back by user equipment, determine each time T region including user equipment according to the beam ID, and determine a quantity of user equipments included in each T region; a calculation module 60, configured to select, according to a preset rule, to-be-connected user equipment from the user equipment included in each T region, and calculate, according to a preset resource allocation policy, a ratio of resources to be allocated to each to-be-connected user equipment; and an allocation module 70, configured to allocate, in a preset allocation manner according to the resource ratio, a resource to be allocated to each user equipment to the user equipment, and send physical downlink control channel PDCCH information to the user equipment to deliver the resource allocated to the user equipment to the user equipment.

In some feasible implementation manners, the communications device further includes: a division module 40, configured to divide a to-be-scanned sector in the cell into multiple S regions, and divide each S region into at least one T region.

The determining module 50 is specifically configured to: for each S region, poll all T regions in the S region in a time division manner by using a single beam, to cover each T region in the S region, and receive a beam ID fed back by the user equipment in the T region.

In some feasible implementation manners, the determining module 50 is specifically configured to: determine, according to the acquired beam ID, a T region in which the user equipment that feeds back the beam ID is located; and determine the quantity of user equipments included in each T region according to a user equipment ID fed back by the user equipment in the T region.

In some feasible implementation manners, the calculation module 60 includes: a selection unit 61, configured to select, according to the preset rule, to-be-connected user equipment from the user equipment included in each T region; and a calculation unit 62, configured to calculate, according to the preset resource allocation policy, the ratio of resources to be allocated to the to-be-connected user equipment selected by the selection unit.

In some feasible implementation manners, the selection unit 61 is specifically configured to: when the T region includes only one user equipment, select the user equipment as the to-be-connected user equipment corresponding to the T region; or when the T region includes multiple user equipments, select, according to preamble IDs fed back by the user equipments, one or more user equipments as the to-be-connected user equipment corresponding to the T region.

In some feasible implementation manners, the selection unit 61 is specifically configured to: when the T region includes multiple user equipments, and the preamble IDs fed back by the user equipments are different from each other, select all the user equipments as the to-be-connected user equipment corresponding to the T region; or when the T region includes multiple user equipments, and the preamble IDs fed back by the user equipments are the same, select, according to a contention mechanism, one user equipment from the multiple user equipments with the same preamble IDs as the to-be-connected user equipment corresponding to the T region.

In some feasible implementation manners, the calculation unit 62 is specifically configured to: calculate, according to a resource allocation policy between the S regions, a ratio of resources to be allocated to all the user equipments in each S region; calculate, according to a resource allocation policy between the T regions in the S region and with reference to the ratio of resources to be allocated to all the user equipments in the S region, a ratio of resources to be allocated to the user equipments in each T region in the S region; and calculate, according to a resource allocation policy between the user equipments in the T region and with reference to the ratio of resources to be allocated to the user equipments in the T region, a ratio of resources to be allocated to each user equipment in the T region.

In some feasible implementation manners, the allocation module 70 is specifically configured to: allocate all OFDM symbols in each timeslot to the user equipments according to the resource ratio by using at least two orthogonal frequency division multiplexing OFDM symbols as a scheduling unit.

In some feasible implementation manners, the allocation module 70 is specifically configured to: allocate a corresponding timeslot resource to each user equipment according to the resource ratio by using one timeslot as a scheduling unit.

In some feasible implementation manners, the allocation module 70 is specifically configured to: generate a beam for the scheduled user equipment according to a scheduling sequence, and send the PDCCH information to the user equipment by using the beam.

In some feasible implementation manners, the communications device described in this embodiment of the present invention includes the division module 40. The division module 40 is configured to divide a to-be-scanned sector in the cell into multiple S regions, and divide each S region into multiple T regions, as shown in FIG. 2. The determining module 500 described in this embodiment may implement the function that can be implemented by the determining module 10 in the first embodiment of the communications device for resource allocation provided in the foregoing embodiment of the present invention. In specific implementation, the determining module 500 determines, according to the beam ID fed back by the user equipment, a T region in which each user equipment is located, and determines the quantity of user equipments included in each T region according to the user equipment ID fed back by each user equipment. For a specific implementation process, refer to a specific implementation manner of the determining module 10 in the first embodiment of the communications device for resource allocation provided in the embodiments of the present invention.

In some feasible implementation manners, after the determining module 50 determines a T region in which each user equipment is located and the quantity of user equipments in each T region, the calculation module 600 may select one or more user equipments from the user equipment included in each T region as to-be-connected user equipment according to the preset rule. Specifically, when the T region includes only one user equipment, the calculation module 60 may select, by using the selection unit 61, the user equipment as the to-be-connected user equipment corresponding to the T region; or when the T region includes multiple user equipments, the selection unit 61 may select, according to the preset rule, one or more user equipments from the multiple user equipments as the to-be-connected user equipment corresponding to the T region, so as to determine a total quantity of to-be-connected user equipments included in all T regions, that is, a total quantity of user equipments included in each S region. Specifically, when the T region includes multiple user equipments, the selection unit 61 may select to-be-connected user equipment according to preamble IDs (Preamble_IDs) sent by the user equipments. When the T region includes multiple user equipments, and the preamble IDs fed back by the user equipments are different from each other, the selection unit 61 may select all the user equipments as the to-be-connected user equipment corresponding to the T region. That is, all the user equipments in the T region may be connected. When the T region includes multiple user equipments, and the preamble IDs fed back by the user equipments are the same, the selection unit 61 may select, according to a contention mechanism, one user equipment from the multiple user equipments with the same preamble IDs as the to-be-connected user equipment corresponding to the T region. That is, the selection unit 61 may select one user equipment for access from all the user equipments that send a same preamble ID. In specific implementation, when the preamble IDs sent by the user equipments in the T region are the same, the selection unit 61 may select one user equipment as the to-be-connected user equipment in a contention manner. This manner of selecting to-be-connected user equipment in a contention manner is similar to a manner in an existing LTE technology of selecting user equipment in a contention manner, and details are not described herein again. As shown in FIG. 4, when an $i^{th}$ beam emitted by the base station scans an $i^{th}$ S region (Si region), it is detected that three T regions include user equipment, where the three T regions are separately Ti6, Ti13, and Ti16, both Ti6 and Ti13 include only one user equipment, and Ti16 includes multiple user equipments (such as three). In this case, the selection unit 61 may select the user equipment included in Ti6 and the user equipment included in Ti13 as to-be-connected user equipment corresponding to Ti6 and to-be-connected user equipment corresponding to Ti13 respectively. For a to-be-connected device corresponding to Ti16, the selection unit 61 may select, according to preamble IDs sent by the user equipments included in Ti16, one, two, or three user equipments as to-be-connected user equipment corresponding to Ti16. As shown in FIG. 4, Ti16 includes three user equipments, where two user equipments send a same preamble ID (in grid shade), and the another user equipment sends a different preamble ID (in oblique line shade). The selection unit 61 may select the user equipment (in oblique line shade) that sends the different preamble ID as to-be-connected user equipment (assumed to be user equipment 1). That is, the user equipment may be connected. For the two user equipments (in grid shade) that send the same preamble ID, the selection unit 61 may select one user equipment as to-be-connected user equipment (assumed to be user equipment 2) in a contention manner. Therefore, the user equipment 1 and the user equipment 2 may be determined as the to-be-connected user equipment corresponding to Ti16. If the preamble IDs sent by the three user equipments included in Ti16 are different from each other, the selection unit 61 may select the three user equipments as the to-be-connected user equipment corresponding to Ti16, and all the three user equipments are connected.

In some feasible implementation manners, after the base station determines information such as the quantity of user equipments included in each S region and a T region in which each user equipment is located, and the to-be-connected user equipment corresponding to each T region, the calculation module 60 may calculate, by using the calculation unit 62 according to the preset resource allocation policy, a resource to be allocated to each user equipment (that is, the ratio of resources to be allocated to each user equipment). The resource allocation policy described in this embodiment of the present invention may include: a resource allocation policy between the S regions in the cell, a resource allocation policy between the T regions in each S region, a resource allocation policy between the user equipments in each T region, and the like. In specific implementation, the resource allocation policy between the S regions may include: allocating resources in a multibeam allocation manner, to schedule the user equipments in the S regions; or evenly allocating resources in a multibeam allocation manner, to schedule the user equipments in the S regions. That is, for resource allocation between the S regions in the cell, resources may be allocated by directly using multiple beams. For example, a resource of one beam is allocated to each S region. Specifically, the calculation unit 62 may further determine, according to a specific situation of user equipments in each S region, whether even allocation is performed for the S regions. In this embodiment of the present invention, resource allocation between the S regions is performed mainly in an even allocation manner. That is, a resource of one beam is allocated to each S region.

In some feasible implementation manners, the resource allocation policy between the T regions in the S region may include: evenly allocating resources in a space division manner, to schedule the user equipments between the T regions; or allocating resources in a space division manner according to a quantity demanded by user equipments in each T region, to schedule the user equipments between the T regions; or allocating resources in a space division manner according to a quantity of user equipments in each T region, to schedule the user equipments between the T regions. Specifically, in this embodiment of the present invention, for each S region, the base station may scan each T region in the S region in a time division manner by using a single beam.

That is, the base station may allocate resources to the T regions in the S region in a time division manner, to implement a space division resource allocation manner by using a time division scanning manner. In specific implementation, after the calculation unit 62 obtains, through calculation, the ratio of resources to be allocated to all user equipments in each S region, the allocation module 70 may calculate, according to the resource ratio, a ratio of resources to be allocated to the user equipments in each T region in the S region. Specifically, when the calculation unit 62 calculates the ratio of resources to be allocated to each T region in the S region, if a difference of user equipment-demanded quantities between the T regions is not considered, resources may be directly allocated to the user equipments in the T regions in an even allocation manner. That is, the allocation module 70 may directly allocate resources (including a time resource and a frequency resource) of a same ratio to each T region including user equipment in an even allocation manner, to schedule the user equipments in the T regions. If the difference of user equipment-demanded quantities between the T regions is considered (that is, when the difference of user equipment-demanded quantities between the T regions is relatively large), the allocation module 70 may further allocate resources according to a quantity demanded by user equipments in each T region, to schedule the user equipments in the T regions. That is, resources of different ratios may be allocated to the T regions according to the quantity demanded by user equipments in each T region, to schedule the user equipments in the T regions. Specifically, the ratio of resources to be allocated to each T region may be directly proportional to the quantity demanded by user equipments in the T region. If a difference of user equipment quantities between the T regions is considered (that is, when user equipment-demanded quantities in the T regions are relatively even, or the difference of the user equipment quantities between the T regions is relatively large), the allocation module 70 may allocate resources according to a quantity of user equipments in each T region. That is, the allocation module 70 may allocate resources of different ratios to the T regions according to the quantity of user equipments in each T region. Specifically, the ratio of resources to be allocated to each T region may be directly proportional to the quantity of user equipments in the T region. That is, in this embodiment of the present invention, when allocating resources to the T regions in the S region, the allocation module 70 may directly allocate resources of a same ratio to the T regions, or allocate resources of different ratios to the T regions according to the difference of the user equipment-demanded quantities between the T regions, or allocate resources of different ratios to the T regions according to the difference of the user equipment quantities between the T regions.

In some feasible implementation manners, after the calculation module 60 obtains, through calculation, the ratio of resources to be allocated to each T region, if the T region includes multiple user equipments, the base station further needs to allocate resources to the user equipments in the T region when allocating resources to the T region. In specific implementation, the resource allocation policy between the user equipments in the T region described in this embodiment of the present invention may include: evenly allocating resources in a frequency division or time division manner, to schedule the user equipments in the T region; or allocating resources in a frequency division or time division manner according to quantities demanded by the user equipments in the T region, to schedule the user equipments in the T region. Specifically, similar to the resource allocation policy between the T regions, for resource allocation between the user equipments in the T region, even allocation may also be directly performed, or resources of different ratios may be allocated to the user equipments according to different quantities demanded by the user equipments, and details are not described herein again. Further, the allocation module 70 may allocate resources to the user equipments in the T region in a time division manner or may allocate resources in a frequency division manner. That is, after the calculation module 60 determines the resources to be allocated to the T region, the allocation module 70 may allocate the resources to be allocated to the T region to the user equipments in a time division manner according to a quantity of user equipments in the T region, or allocate the resources to be allocated to the T region to the user equipments in a frequency division manner according to a quantity of user equipments in the T region.

Figure 5:
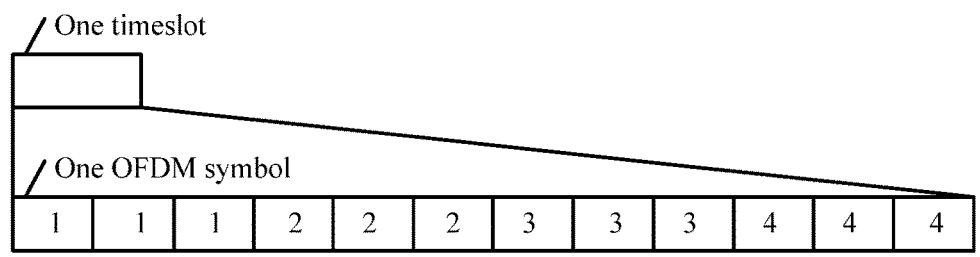
FIG. 5 is a schematic diagram of a scheduling manner in a second embodiment of a communications device for resource allocation according to the embodiments of the present invention.

In some feasible implementation manners, after the calculation module 60 calculates, according to the preset resource allocation policy, the ratio of resources to be allocated to each user equipment, the allocation module 70 may allocate the resources to the user equipment. Specifically, the allocation module 70 may allocate a resource to be allocated to each user equipment to the user equipment in the preset allocation manner according to the resource ratio obtained through calculation by the calculation module 60, and send the PDCCH information to the user equipment to deliver the resource allocated to the user equipment to the user equipment. In specific implementation, the preset allocation manner described in this embodiment of the present invention may include a symbol scheduling allocation manner or a timeslot scheduling allocation manner. That is, the allocation module 70 may allocate resources to the user equipments in the symbol scheduling allocation manner, or allocate resources to the user equipments in the timeslot scheduling allocation manner. Specifically, referring to FIG. 5, when the allocation module 70 allocates resources to the user equipments in the symbol scheduling manner, multiple orthogonal frequency division multiplexing (Orthogonal Frequency Division Multiplexing, OFDM) symbols may be used as a scheduling unit (also referred to as a minimum scheduling unit). A quantity of the multiple OFDM symbols needs to be at least two, and the multiple OFDM symbols need to include at least two cell-specific reference signals (Cell-specific Reference Signals, CRSs) and two demodulation reference information (Demodulation Reference Signals, DRSs), so that a channel of information data is estimated by using the at least two CRS signals and DRS signals. The allocation module 70 may allocate, by using the at least two OFDM symbols as a scheduling unit, all OFDM symbols (all available OFDM symbols) in one timeslot to the user equipments according to the resource ratio obtained through calculation, so that all user equipments obtain scheduled resources in each timeslot. When a next timeslot arrives, the allocation module 70 may allocate all available OFDM symbols in the timeslot to the user equipments according to the resource ratio obtained through calculation by the calculation module 60, and such allocation is performed circularly, to allocate available OFDM symbols in each timeslot to the user equipments. In FIG. 5, OFDM symbols marked by a same number indicate OFDM symbols allocated to same user equipment. When allocating resources in a timeslot scheduling manner, the allocation module 70 may allocate, by using one timeslot as a scheduling unit, a corresponding timeslot resource to each user equipment according to the resource ratio obtained through calculation by the calculation module 60. Referring to FIG.

Figure 6:
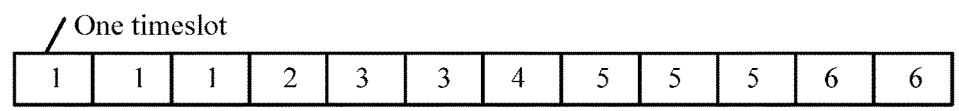
FIG. 6 is a schematic diagram of another scheduling manner in a second embodiment of a communications device for resource allocation according to the embodiments of the present invention.

6, the base station allocates an entire timeslot to one user equipment by using each timeslot as a minimum scheduling unit, and allocates a corresponding timeslot resource to each user equipment according to the resource ratio obtained through calculation. In FIG. 6, timeslot resources marked by a same number indicate timeslot resources allocated to same user equipment.

In some feasible implementation manners, after allocating resources to the user equipments, the allocation module 70 may perform beamforming according to a direction of the user equipment, to generate a beam for the user equipment. That is, beamforming may be performed according to the direction of the user equipment, to generate a beam for the scheduled user equipment, and the PDCCH information is sent to the user equipment by using the beam. In specific implementation, the PDCCH information is used to indicate information about the resource of the scheduled user equipment, and after receiving the resource delivered by the base station and the PDCCH information, the user equipment may parse out the information about the resource of the user equipment according to the PDCCH information. In an existing LTE technology, resource information of all terminals (that is, user equipments) is allocated on the first three symbols of a subframe, and resource information of different user equipments is distinguished by using a frequency. In an application scenario provided in this embodiment of the present invention, because the beam emitted by the base station is a high-frequency narrow beam, and a width of the beam is relatively narrow, when the beam emitted by the base station points to one region (such as a Tn region in an Si region), user equipment in another region (such as another T region in the Si region) cannot receive information, that is, the PDCCH information, transmitted by the base station. In the application scenario provided in this embodiment of the present invention, to enable user equipment in each T region to receive the PDCCH information transmitted by the base station, the PDCCH information needs to be delivered separately. That is, when the beam emitted by the base station is switched from a region Tij to a region Tik (j is unequal to k), the allocation module 70 needs to send only PDCCH information of user equipment included in the current region Tik, so that the user equipment in each T region may receive PDCCH information corresponding to the user equipment, so as to parse out resource information of the user equipment according to the PDCCH information corresponding to the user equipment.

In some feasible implementation manners, the base station may allocate resources to the user equipments in the T region in a time division manner or in a frequency division manner. Therefore, when the base station allocates resources in a symbol scheduling manner, besides frequency domain resource allocation in one timeslot, time domain resource allocation is also included. However, because the time domain resources are not fixed, both a frequency domain resource allocation field and a time domain resource allocation field need to be included in a structure of a PDCCH, to indicate information about the resource of the currently scheduled user equipment.

In this embodiment of the present invention, in an application scenario in which a base station implements cell-wide coverage by using a high-frequency narrow beam, the base station (that is, a communications device described in this embodiment of the present invention) may determine, according to a beam ID fed back by user equipment in each T region, user equipment included in each T region and locations and a quantity of user equipments included in an S region; select to-be-connected user equipment from the user equipment included in each T region; then calculate, according to a quantity of user equipments in each T region in the S region or a quantity demanded by user equipments in each T region in the S region or a quantity of user equipments in the T region or a quantity demanded by user equipments in the T region, a ratio of resources to be allocated to each user equipment; allocate a resource to each user equipment in a symbol scheduling manner or a timeslot scheduling manner; and send PDCCH information to the user equipment to deliver the resource allocated to the user equipment to the user equipment. The communications device (that is, the base station) for resource allocation provided in this embodiment of the present invention may support resource allocation in an implementation manner in which the base station implements cell-wide coverage by using the high-frequency narrow beam, and may allocate resources to user equipments according to an actual distribution situation of the user equipments, thereby improving flexibility of resource allocation and efficiency of resource allocation, maximizing a resource utilization rate on a basis that a user obtains fair experience, and enhancing user experience in resource allocation.

Figure 7:
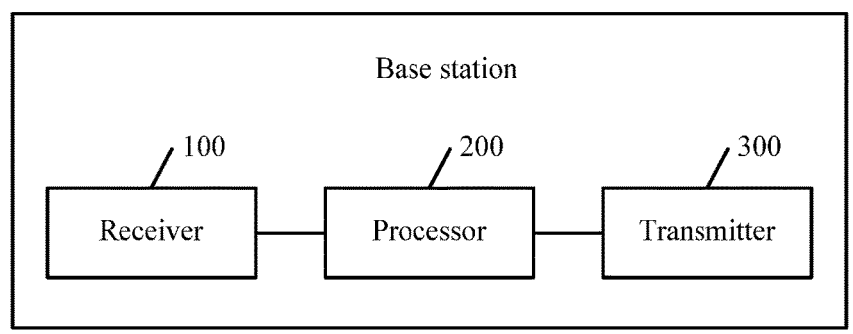
FIG. 7 is a schematic structural diagram of a first embodiment of a base station according to the embodiments of the present invention.

Refer FIG. 7, which is the schematic structural diagram of a base station according to an embodiment of the present invention. The base station described in this embodiment includes: a receiver 100, configured to acquire, from a space S region corresponding to each beam in a cell, each beam identity ID fed back by user equipment; a processor 200, configured to determine each time T region including user equipment according to the beam ID acquired by the receiver, and determine a quantity of user equipments included in each T region, where the processor 200 is further configured to select, according to a preset rule, to-be-connected user equipment from the user equipment included in each T region, and calculate, according to a preset resource allocation policy, a ratio of resources to be allocated to each to-be-connected user equipment; and the processor 200 is further configured to allocate, in a preset allocation manner according to the resource ratio, a resource to be allocated to each user equipment to the user equipment; and a transmitter 300, configured to send physical downlink control channel PDCCH information to the user equipment selected by the processor to deliver the resource allocated to the user equipment to the user equipment.

In some feasible implementation manners, the processor 200 is further configured to: divide a to-be-scanned sector in the cell into multiple S regions, and divide each S region into at least one T region; and the transmitter 300 is further configured to: for each S region, poll all T regions in the S region in a time division manner by using a single beam, to cover each T region in the S region, and the receiver receives a beam ID fed back by the user equipment in the T region.

In some feasible implementation manners, the processor 200 is specifically configured to: determine, according to the beam ID acquired by the receiver, a T region in which the user equipment that feeds back the beam ID is located; and determine the quantity of user equipments included in each T region according to a user equipment ID fed back by the user equipment in the T region.

In some feasible implementation manners, the processor 200 is specifically configured to: when the T region includes only one user equipment, select the user equipment as the to-be-connected user equipment corresponding to the T region; or when the T region includes multiple user equipments, select, according to preamble IDs fed back by the user equipments, one or more user equipments as the to-be-connected user equipment corresponding to the T region.

In some feasible implementation manners, the processor 200 is specifically configured to: when the T region includes multiple user equipments, and the preamble IDs fed back by the user equipments are different from each other, select all the user equipments as the to-be-connected user equipment corresponding to the T region; or when the T region includes multiple user equipments, and the preamble IDs fed back by the user equipments are the same, select, according to a contention mechanism, one user equipment from the multiple user equipments with the same preamble IDs as the to-be-connected user equipment corresponding to the T region.

In some feasible implementation manners, the processor 200 is specifically configured to: calculate, according to a resource allocation policy between the S regions, a ratio of resources to be allocated to all the user equipments in each S region; calculate, according to a resource allocation policy between the T regions in the S region and with reference to the ratio of resources to be allocated to all the user equipments in the S region, a ratio of resources to be allocated to the user equipments in each T region in the S region; and calculate, according to a resource allocation policy between the user equipments in the T region and with reference to the ratio of resources to be allocated to the user equipments in the T region, a ratio of resources to be allocated to each user equipment in the T region.

In some feasible implementation manners, the processor 200 is specifically configured to: allocate all OFDM symbols in each timeslot to the user equipments according to the resource ratio by using at least two orthogonal frequency division multiplexing OFDM symbols as a scheduling unit.

In some feasible implementation manners, the processor 200 is specifically configured to: allocate a corresponding timeslot resource to each user equipment according to the resource ratio by using one timeslot as a scheduling unit.

In some feasible implementation manners, the transmitter 300 is specifically configured to: generate a beam for the scheduled user equipment according to a scheduling sequence, and send the PDCCH information to the user equipment by using the beam.

In some feasible implementation manners, the base station described in this embodiment of the present invention may be specifically the communications device for resource allocation described in the embodiment of the present invention, or include the communications device for resource allocation described in the embodiment of the present invention. This embodiment of the present invention is specifically described by assuming that the base station is the communications device provided in the embodiments of the present invention. For a specific implementation process of the base station described in this embodiment of the present invention, refer to an implementation manner described in the first embodiment and the second embodiment of the scanning device in a high-frequency system provided in the embodiments of the present invention. The receiver 100, the processor 200, and the transmitter 300 included in the base station may be specifically applied to the division module, the determining module, the calculation module, or the allocation module in the scanning device described in the first embodiment and the second embodiment in the high-frequency system provided in the embodiments of the present invention. For a specific implementation process, refer to a specific implementation manner of the scanning device described in the first embodiment and the second embodiment in the high-frequency system provided in the embodiments of the present invention, and details are not described herein again.

Figure 8:
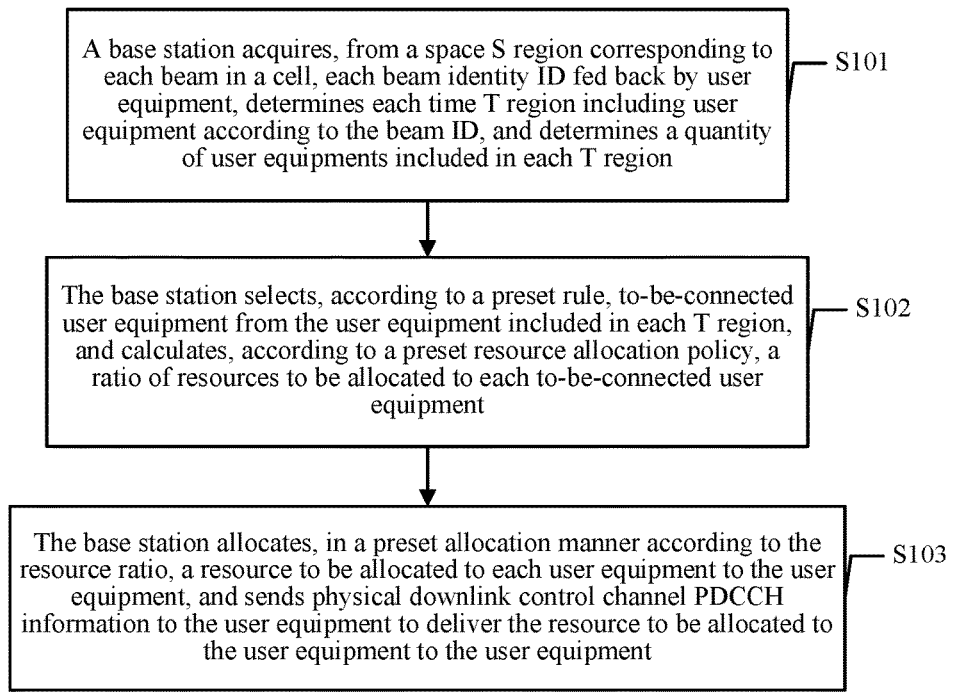
FIG. 8 is a schematic flowchart of a first embodiment of a method for resource allocation according to the embodiments of the present invention.

Refer to FIG. 8, which is a schematic flowchart of a first embodiment of a method for resource allocation according to the embodiments of the present invention. The method for resource allocation described in this embodiment includes steps:

S101. A base station acquires, from a space S region corresponding to each beam in a cell, each beam identity ID fed back by user equipment(s), determines each time T region including user equipment according to the beam ID, and determines a quantity of user equipments included in each T region.

In specific implementation, the user equipment described in the method for resource allocation provided in this embodiment of the present invention may be specifically a mobile terminal on an MS side, and the method for resource allocation described in this embodiment of the present invention may be applied to the communications device (or the base station) for resource allocation provided in the embodiment of the present invention. The user equipment described in this embodiment of the present invention may emit a narrow beam for scanning, to align with a beam emitted by the base station. When the beam emitted by the user equipment is completely aligned with the beam emitted by the base station, power of a signal received by the user equipment is the strongest, so that information such as a synchronization sequence may be acquired from a beam signal transmitted by the base station.

In some feasible implementation manners, the method for resource allocation provided in this embodiment of the present invention is a resource allocation solution in a scenario of implementing cell-wide coverage in wavelength division and space division manners on a network on which a beam is limited and a width of the beam is relatively narrow. In the foregoing scenario, the base station may implement cell-wide coverage for each space region (Space region, S region for short) in a single beam scanning manner while implementing cell-wide coverage by using multiple beams. That is, the base station may cover multiple S regions by using multiple beams, where each beam corresponds to one S region, and in each S region, each time region (Time region, T region for short) in the S region may be polled in a time division manner by using a single beam. That is, each single beam that covers the S region may point to a different T region in the S region according to a different time point, so as to implement cell-wide coverage. Specifically, the base station may first divide a to-be-scanned sector in the cell into multiple S regions, and divide each S region into multiple T regions (that is, at least one T region), as shown in FIG. 2. For each S region, the base station polls all T regions in the S region in a time division manner by using a single beam, to cover each T region, so that coverage for each S region is implemented by covering each T region, then coverage for the sector is implemented by covering each S region, and finally, cell-wide coverage is implemented by covering each sector. After dividing each sector in the cell covered by the base station into multiple S regions and dividing each S region into multiple T regions, the base station may cover (that is, perform signal scanning on) all S regions by using multiple beams emitted by the base station, where one beam corresponds to one S region, so as to implement coverage for the T regions in the S region by using a single beam, and send information such as a synchronization sequence to user equipment in the T region. The user equipment in the T region may perform scanning by using a beam emitted by the user equipment, align with the beam emitted by the base station, and acquire the information such as the synchronization sequence from the beam signal sent by the base station, so as to select a serving beam for the user equipment according to the information such as the synchronization sequence, and feed back information such as a sequence of the serving beam to the base station. The base station may perform scanning by using the beam emitted by the base station, and receive the information such as the sequence fed back by the user equipment in each T region, so as to acquire, from the information such as the sequence, a beam identity (Identity, ID) (that is, an ID of the serving beam) fed back by the user equipment. In specific implementation, each T region corresponds to one beam ID, and the base station may determine, according to the beam ID fed back by each user equipment, a T region in which each user equipment is located.

In some feasible implementation manners, after acquiring, from each T region in the S region corresponding to each beam, the beam ID fed back by the user equipment, the base station may determine the T region including the user equipment according to the beam ID, so as to determine the quantity of user equipments included in each T region. Specifically, the base station polls all T regions in a time division manner by using the single beam. That is, each single beam points to a different T region according to a different time point. For example, the beam points to an $N^{th}$ T region at a Tn time point. Therefore, when the base station acquires the beam ID fed back by the user equipment, the base station may determine, according to a time (or a specific time point) at which the beam ID is acquired, a T region in which the user equipment that feeds back the beam ID is located. After determining a location (that is, a T region in which each user equipment is located) of each user equipment according to the beam ID fed back by the user equipment, the base station may further determine the quantity of user equipments included in each T region according to a user equipment ID fed back by the user equipment. Specifically, the user equipment also feeds back the user equipment ID when feeding back the beam ID, and the base station may distinguish different user equipments by identifying user equipment IDs in each T region, so as to determine a quantity of user equipments in a current T region. The user equipment ID may include a globally unique user equipment ID (that is, an ID allocated by a system to the user equipment when the user equipment accesses a communications network, and a globally unique ID) or may include a c-RNTI.

S102. The base station selects, according to a preset rule, to-be-connected user equipment(s) from the user equipment (s) included in each T region, and calculates, according to a preset resource allocation policy, a ratio of resources to be allocated to each to-be-connected user equipment.

In some feasible implementation manners, after determining a T region in which each user equipment is located and the quantity of user equipments in each T region, the base station may select one or more user equipments from the user equipment included in each T region as to-be-connected user equipment according to the preset rule. Specifically, when the T region includes only one user equipment, the user equipment may be selected as the to-be-connected user equipment corresponding to the T region; or when the T region includes multiple user equipments, one or more user equipments may be selected, according to the preset rule, from the multiple user equipments as the to-be-connected user equipment corresponding to the T region, so as to determine a total quantity of to-be-connected user equipments included in all T regions, that is, a total quantity of user equipments included in each S region. After determining information such as the quantity of user equipments included in each T region, the quantity of user equipments included in each S region, and a T region in which each user equipment is located, the base station may calculate, according to the preset resource allocation policy, a resource to be allocated to each user equipment (that is, the ratio of resources to be allocated to each user equipment). For example, the base station may calculate, according to a preset resource allocation policy between the S regions, a ratio (or referred to as a resource ratio) of resources to be allocated to user equipments included in each S region; or calculate, according to a preset resource allocation policy of the T regions in the S region, a ratio of resources to be allocated to user equipments included in all T regions in one S region.

S103. The base station allocates, in a preset allocation manner according to the resource ratio, a resource to be allocated to each user equipment to the user equipment, and sends physical downlink control channel PDCCH information to the user equipment to deliver the resource allocated to the user equipment to the user equipment.

In some feasible implementation manners, after calculating, according to the preset resource allocation policy, the ratio of resources to be allocated to each user equipment, the base station may allocate the resources to the user equipment. Specifically, the base station may allocate a resource to be allocated to each user equipment to the user equipment in the preset allocation manner according to the resource ratio obtained through calculation, and send the PDCCH information to the user equipment to deliver the resource allocated to the user equipment to the user equipment. In specific implementation, the PDCCH information is used to indicate information about the resource of the scheduled user equipment, and after receiving the resource delivered by the base station and the PDCCH information, the user equipment may parse out the information about the resource of the user equipment according to the PDCCH information. In an existing LTE technology, resource information of all terminals (that is, user equipments) is allocated on the first three symbols of a subframe, resource information of different user equipments is distinguished by using a frequency, and before scheduling, the base station may broadcast PDCCH information of all the user equipments to all the user equipments in a manner such as broadcasting. In an application scenario provided in this embodiment of the present invention, because the beam emitted by the base station is a high-frequency narrow beam, and a width of the beam is relatively narrow, when the beam emitted by the base station points to one region (such as a Tn region in an Si region), user equipment in another region (such as another T region in the Si region) cannot receive information, including the PDCCH information, transmitted by the base station. In the application scenario provided in this embodiment of the present invention, to enable user equipment in each T region to receive the PDCCH information transmitted by the base station, the PDCCH information needs to be delivered separately. That is, when the beam emitted by the base station is switched from a region Tij to a region Tik (j is unequal to k), only PDCCH information of user equipment included in the current region Tik needs to be sent, so that the user equipment in each T region may receive PDCCH information corresponding to the user equipment, so as to parse out resource information of the user equipment according to the PDCCH information corresponding to the user equipment.

In this embodiment of the present invention, in an application scenario in which a base station implements cell-wide coverage by using a high-frequency narrow beam, the base station may determine, according to a beam ID fed back by user equipment in each T region, user equipment included in each T region and locations and a quantity of user equipments included in an S region; select to-be-connected user equipment from the user equipment included in each T region; then calculate, according to a preset resource allocation policy, a ratio of resources to be allocated to each user equipment; and send PDCCH information to the user equipment to deliver a resource to be allocated to the user equipment to the user equipment. The method for resource allocation provided in this embodiment of the present invention may support resource allocation in an implementation manner in which the base station implements cell-wide coverage by using the high-frequency narrow beam, thereby improving flexibility of resource allocation and efficiency of resource allocation, and enhancing user experience in resource allocation.

Figure 9:
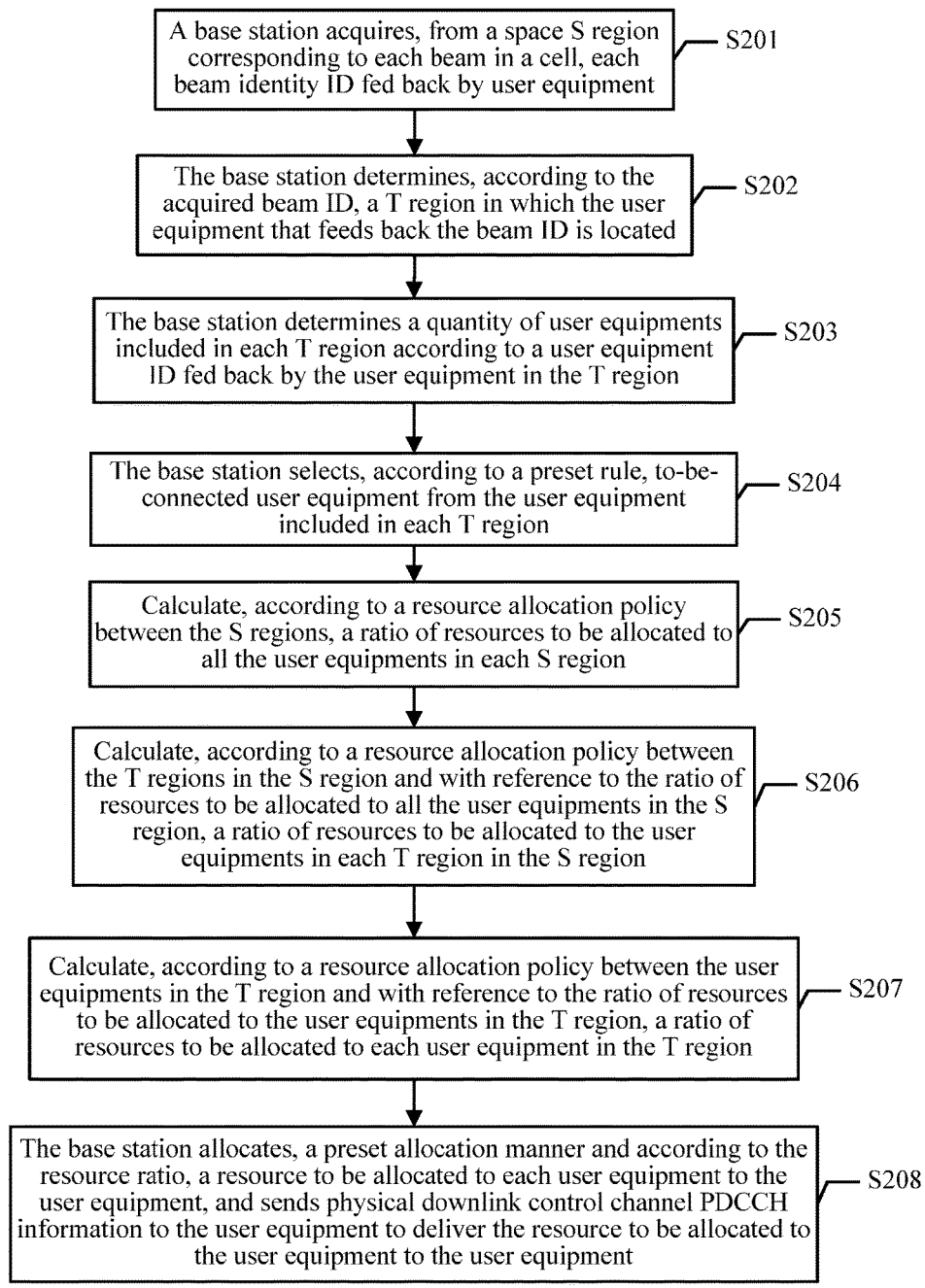
FIG. 9 is a schematic flowchart of a second embodiment of a method for resource allocation according to the embodiments of the present invention.

Refer to FIG. 9, which is a schematic flowchart of a second embodiment of a method for resource allocation according to the embodiments of the present invention. The method for resource allocation described in this embodiment includes steps:

S201. A base station acquires, from a space S region corresponding to each beam in a cell, each beam identity ID fed back by user equipment.

S202. The base station determines, according to the acquired beam ID, a T region in which the user equipment that feeds back the beam ID is located.

S203. The base station determines a quantity of user equipments included in each T region according to a user equipment ID fed back by the user equipment in the T region.

In some feasible implementation manners, the base station determines, according to the beam ID fed back by the user equipment, a T region in which each user equipment is located, and determines the quantity of user equipments included in each T region according to the user equipment ID fed back by each user equipment. For a specific implementation process, refer to step S101 in the first embodiment of the method for resource allocation provided in the embodiments of the present invention, and details are not described herein again.

S204. The base station selects, according to a preset rule, to-be-connected user equipment from the user equipment included in each T region.

In some feasible implementation manners, after determining a T region in which each user equipment is located and the quantity of user equipments in each T region, the base station may select one or more user equipments from the user equipment included in each T region as to-be-connected user equipment according to the preset rule. Specifically, when the T region includes only one user equipment, the user equipment may be selected as the to-be-connected user equipment corresponding to the T region; or when the T region includes multiple user equipments, one or more user equipments may be selected, according to the preset rule, from the multiple user equipments as the to-be-connected user equipment corresponding to the T region, so as to determine a total quantity of to-be-connected user equipments included in all T regions, that is, a total quantity of user equipments included in each S region. Specifically, when the T region includes multiple user equipments, the base station may select to-be-connected user equipment according to preamble IDs (Preamble_IDs) sent by the user equipments. When the T region includes multiple user equipments, and the preamble IDs fed back by the user equipments are different from each other, all the user equipments may be selected as the to-be-connected user equipment corresponding to the T region. That is, all the user equipments in the T region may be connected. When the T region includes multiple user equipments, and the preamble IDs fed back by the user equipments are the same, one user equipment may be selected, according to a contention mechanism, from the multiple user equipments with the same preamble IDs as the to-be-connected user equipment corresponding to the T region. That is, one user equipment may be selected for access from all the user equipments that send a same preamble ID. In specific implementation, when the preamble IDs sent by the user equipments in the T region are the same, one user equipment may be selected as the to-be-connected user equipment in a contention manner. This manner of selecting to-be-connected user equipment in a contention manner is similar to a manner in an existing LTE technology of selecting user equipment in a contention manner, and details are not described herein again. As shown in FIG. 4, when an $i^{th}$ beam emitted by the base station scans an $i^{th}$ S region (Si region), it is detected that three T regions include user equipment, where the three T regions are separately Ti6, Ti13, and Ti16, both Ti6 and Ti13 include only one user equipment, and Ti16 includes multiple user equipments (such as three). In this case, the base station may select the user equipment included in Ti6 and the user equipment included in Ti13 as to-be-connected user equipment corresponding to Ti6 and to-be-connected user equipment corresponding to Ti13 respectively. For a to-be-connected device corresponding to Ti16, one, two, or three user equipments may be selected, according to preamble IDs sent by the user equipments included in Ti16, as to-be-connected user equipment corresponding to Ti16. As shown in FIG. 4, Ti16 includes three user equipments, where two user equipments send a same preamble ID (in grid shade), and the another user equipment sends a different preamble ID (in oblique line shade), the user equipment (in oblique line shade) that sends the different preamble ID may be selected as to-be-connected user equipment (assumed to be user equipment 1). That is, the user equipment may be connected. For the two user equipments (in grid shade) that send the same preamble ID, one user equipment may be selected as to-be-connected user equipment (assumed to be user equipment 2) in a contention manner. Therefore, the user equipment 1 and the user equipment 2 may be determined as the to-be-connected user equipment corresponding to Ti16. If the preamble IDs sent by the three user equipments included in Ti16 are different from each other, the three user equipments may be selected as the to-be-connected user equipment corresponding to Ti16, and all the three user equipments are connected.

S205. Calculate, according to a resource allocation policy between the S regions, a ratio of resources to be allocated to all the user equipments in each S region.

S206. Calculate, according to a resource allocation policy between the T regions in the S region and with reference to the ratio of resources to be allocated to all the user equipments in the S region, a ratio of resources to be allocated to the user equipments in each T region in the S region.

S207. Calculate, according to a resource allocation policy between the user equipments in the T region and with reference to the ratio of resources to be allocated to the user equipments in the T region, a ratio of resources to be allocated to each user equipment in the T region.

In some feasible implementation manners, after determining information such as the quantity of user equipments included in each S region and a T region in which each user equipment is located, and the to-be-connected user equipment corresponding to each T region, the base station may calculate, according to the preset resource allocation policy, a resource to be allocated to each user equipment (that is, the ratio of resources to be allocated to each user equipment). The resource allocation policy described in this embodiment of the present invention may include: a resource allocation policy between the S regions in the cell, a resource allocation policy between the T regions in each S region, a resource allocation policy between the user equipments in each T region, and the like. In specific implementation, the resource allocation policy between the S regions may include: allocating resources in a multibeam allocation manner, to schedule the user equipments in the S regions; or evenly allocating resources in a multibeam allocation manner, to schedule the user equipments in the S regions. That is, for resource allocation between the S regions in the cell, resources may be allocated by directly using multiple beams. For example, a resource of one beam is allocated to each S region. Specifically, whether even allocation is performed for the S regions may be further determined according to a specific situation of user equipments in each S region. In this embodiment of the present invention, resource allocation between the S regions is performed mainly in an even allocation manner. That is, a resource of one beam is allocated to each S region.

In some feasible implementation manners, the resource allocation policy between the T regions in the S region may include: evenly allocating resources in a space division manner, to schedule the user equipments between the T regions; or allocating resources in a space division manner according to a quantity demanded by user equipments in each T region, to schedule the user equipments between the T regions; or allocating resources in a space division manner according to a quantity of user equipments in each T region, to schedule the user equipments between the T regions. Specifically, in this embodiment of the present invention, for each S region, the base station may scan each T region in the S region in a time division manner by using a single beam. That is, the base station may allocate resources to the T regions in the S region in a time division manner, to implement a space division resource allocation manner by using a time division scanning manner. In specific implementation, after obtaining, through calculation, the ratio of resources to be allocated to all user equipments in each S region, the base station may calculate, according to the resource ratio, a ratio of resources to be allocated to the user equipments in each T region in the S region. Specifically, when the base station calculates the ratio of resources to be allocated to each T region in the S region, if a difference of user equipment-demanded quantities between the T regions is not considered, the base station may directly allocate resources to the user equipments in the T regions in an even allocation manner. That is, the base station may directly allocate resources (including a time resource and a frequency resource) of a same ratio to each T region including user equipment in an even allocation manner, to schedule the user equipments in the T regions. If the difference of user equipment-demanded quantities between the T regions is considered (that is, when the difference of user equipment-demanded quantities between the T regions is relatively large), the base station may further allocate resources according to a quantity demanded by user equipments in each T region, to schedule the user equipments in the T regions. That is, the base station may allocate resources of different ratios to the T regions according to the quantity demanded by user equipments in each T region, to schedule the user equipments in the T regions. Specifically, the ratio of resources to be allocated to each T region may be directly proportional to the quantity demanded by user equipments in the T region. If a difference of user equipment quantities between the T regions is considered (that is, when user equipment-demanded quantities in the T regions are relatively even, or the difference of the user equipment quantities between the T regions is relatively large), the base station may allocate resources according to a quantity of user equipments in each T region. That is, the base station may allocate resources of different ratios to the T regions according to the quantity of user equipments in each T region. Specifically, the ratio of resources to be allocated to each T region may be directly proportional to the quantity of user equipments in the T region. That is, in this embodiment of the present invention, when allocating resources to the T regions in the S region, the base station may directly allocate resources of a same ratio to the T regions, or allocate resources of different ratios to the T regions according to the difference of the user equipment-demanded quantities between the T regions, or allocate resources of different ratios to the T regions according to the difference of the user equipment quantities between the T regions.

In some feasible implementation manners, after the base station obtains, through calculation, the ratio of resources to be allocated to each T region, if the T region includes multiple user equipments, the base station further needs to allocate resources to the user equipments in the T region when allocating resources to the T region. In specific implementation, the resource allocation policy between the user equipments in the T region described in this embodiment of the present invention may include: evenly allocating resources in a frequency division or time division manner, to schedule the user equipments in the T region; or allocating resources in a frequency division or time division manner according to quantities demanded by the user equipments in the T region, to schedule the user equipments in the T region. Specifically, similar to the resource allocation policy between the T regions, for resource allocation between the user equipments in the T region, even allocation may also be directly performed, or resources of different ratios may be allocated to the user equipments according to different quantities demanded by the user equipments, and details are not described herein again. Further, the base station may allocate resources to the user equipments in the T region in a time division manner or may allocate resources in a frequency division manner. That is, after determining the resources to be allocated to the T region, the base station may allocate the resources to be allocated to the T region to the user equipments in a time division manner according to a quantity of user equipments in the T region, or allocate the resources to be allocated to the T region to the user equipments in a frequency division manner according to a quantity of user equipments in the T region.

S208. The base station allocates, in a preset allocation manner according to the resource ratio, a resource to be allocated to the user equipment to the user equipment, and sends physical downlink control channel PDCCH information to the user equipment to deliver the resource allocated to the user equipment to the user equipment.

In some feasible implementation manners, after calculating, according to the preset resource allocation policy, the ratio of resources to be allocated to each user equipment, the base station may allocate the resources to the user equipment. Specifically, the base station may allocate a resource to be allocated to each user equipment to the user equipment in the preset allocation manner according to the resource ratio obtained through calculation, and send the PDCCH information to the user equipment to deliver the resource allocated to the user equipment to the user equipment. In specific implementation, the preset allocation manner described in this embodiment of the present invention may include a symbol scheduling allocation manner or a timeslot scheduling allocation manner. That is, the base station may allocate resources to the user equipments in the symbol scheduling allocation manner, or allocate resources to the user equipments in the timeslot scheduling allocation manner. Specifically, referring to FIG. 5, when the base station allocates resources to the user equipments in the symbol scheduling manner, multiple OFDM symbols may be used as a scheduling unit (also referred to as a minimum scheduling unit). A quantity of the multiple OFDM symbols needs to be at least two, and the multiple OFDM symbols need to include at least two CRSs and two DRSs, so that a channel of information data is estimated by using the at least two CRS signals and DRS signals. The base station may allocate, by using the at least two OFDM symbols as a scheduling unit, all OFDM symbols (all available OFDM symbols) in one timeslot to the user equipments according to the resource ratio obtained through calculation, so that all user equipments obtain scheduled resources in each timeslot. When a next timeslot arrives, the base station may allocate all available OFDM symbols in the timeslot to the user equipments according to the resource ratio obtained through calculation, and such allocation is performed circularly, to allocate available OFDM symbols in each timeslot to the user equipments. In FIG. 5, OFDM symbols marked by a same number indicate OFDM symbols allocated to same user equipment. When allocating resources in a timeslot scheduling manner, the base station may allocate, by using one timeslot as a scheduling unit, a corresponding timeslot resource to each user equipment according to the resource ratio obtained through calculation. Referring to FIG. 6, the base station allocates an entire timeslot to one user equipment by using each timeslot as a minimum scheduling unit, and allocates a corresponding timeslot resource to each user equipment according to the resource ratio obtained through calculation. In FIG. 6, timeslot resources marked by a same number indicate timeslot resources allocated to same user equipment.

In some feasible implementation manners, after allocating resources to the user equipments, the base station may perform beamforming according to a direction of the user equipment, to generate a beam for the user equipment. That is, beamforming may be performed according to the direction of the user equipment, to generate a beam for the scheduled user equipment, and the PDCCH information is sent to the user equipment by using the beam. In specific implementation, the PDCCH information is used to indicate information about the resource of the scheduled user equipment, and after receiving the resource delivered by the base station and the PDCCH information, the user equipment may parse out the information about the resource of the user equipment according to the PDCCH information. In an existing LTE technology, resource information of all terminals (that is, user equipments) is allocated on the first three symbols of a subframe, and resource information of different user equipments is distinguished by using a frequency. In an application scenario provided in this embodiment of the present invention, because the beam emitted by the base station is a high-frequency narrow beam, and a width of the beam is relatively narrow, when the beam emitted by the base station points to one region (such as a Tn region in an Si region), user equipment in another region (such as another T region in the Si region) cannot receive information, that is, the PDCCH information, transmitted by the base station. In the application scenario provided in this embodiment of the present invention, to enable user equipment in each T region to receive the PDCCH information transmitted by the base station, the PDCCH information needs to be delivered separately. That is, when the beam emitted by the base station is switched from a region Tij to a region Tik (j is unequal to k), only PDCCH information of user equipment included in the current region Tik needs to be sent, so that the user equipment in each T region may receive PDCCH information corresponding to the user equipment, so as to parse out resource information of the user equipment according to the PDCCH information corresponding to the user equipment.

In some feasible implementation manners, the base station may allocate resources to the user equipments in the T region in a time division manner or in a frequency division manner. Therefore, when the base station allocates resources in a symbol scheduling manner, besides frequency domain resource allocation in one timeslot, time domain resource allocation is also included. However, because the time domain resources are not fixed, both a frequency domain resource allocation field and a time domain resource allocation field need to be included in a structure of a PDCCH, to indicate information about the resource of the currently scheduled user equipment.

In this embodiment of the present invention, in an application scenario in which a base station implements cell-wide coverage by using a high-frequency narrow beam, the base station may determine, according to a beam ID fed back by user equipment in each T region, user equipment included in each T region and locations and a quantity of user equipments included in an S region; select to-be-connected user equipment from the user equipment included in each T region; then calculate, according to a quantity or quantities demanded by user equipments in the T regions in the S region or a quantity or quantities demanded by user equipments in the T region, a ratio of resources to be allocated to each user equipment; allocate a resource to each user equipment in a symbol scheduling manner or a timeslot scheduling manner; and send PDCCH information to the user equipment to deliver the resource allocated to the user equipment to the user equipment. The method for resource allocation provided in this embodiment of the present invention may support resource allocation in an implementation manner in which the base station implements cell-wide coverage by using the high-frequency narrow beam, and may allocate resources to user equipments according to an actual distribution situation of the user equipments, thereby improving flexibility of resource allocation and efficiency of resource allocation, maximizing a resource utilization rate on a basis that a user obtains fair experience, and enhancing user experience in resource allocation.

The scanning method in a high frequency system disclosed in the foregoing embodiments of the present invention may be applied to a base station and user equipment, and may be specifically implemented by a hardware module such as a receiver, a processor, or a transmitter in the base station or in the user equipment. In an implementation process, steps of the foregoing method may be executed by an integrated logic circuit of hardware in the receiver, the transmitter or the processor or by instructions in a software form. The processor may be a general purpose processor, a digital signal processor, an application-specific integrated circuit, a field programmable gate array, or another programmable logic device, discrete gate or transistor logic device, or discrete hardware component, and the processor may implement or execute the methods, steps, and logical block diagrams disclosed in the embodiments of the present invention. The general purpose processor may be a microprocessor, any conventional processor, or the like. Steps of the methods disclosed with reference to the embodiments of the present invention may be directly executed and completed by means of a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register.

It should be understood that reference throughout this specification to "one embodiment" or "an embodiment" means that a particular feature, structure, or characteristic associated with the embodiment is included in at least one embodiment of the present invention. Therefore, the appearances of the phrases such as "in one embodiment", or "in an embodiment" in various places throughout this specification are not necessarily referring to a same embodiment. In addition, the particular feature, structure, or characteristics may be combined in one or more embodiments in any suitable manner. Sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

It should be understood that in the embodiments of the present invention, "B corresponding to A" indicates that B is associated with A, and B may be determined according to A. However, it should be further understood that determining B according to A does not mean that B is determined only according to A, and B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing base station, device, and module, refer to a corresponding process in the foregoing method embodiments, and details are not described herein again.

In the several embodiments provided in the present application, it should be understood that the disclosed apparatus and method may be implemented in other manners. For example, the described apparatus embodiment is merely exemplary. For example, the module division is merely logical function division and may be other division in actual implementation. For example, a plurality of modules or components may be combined or integrated into another system, or some features may be ignored or not performed.

In addition, the displayed or discussed mutual couplings or direct couplings or communication connections may be implemented by using some interfaces. The indirect couplings or communication connections between the apparatuses or units may be implemented in electronic, mechanical, or other forms.

In addition, functional units (or functional modules) in the embodiments of the present invention may be integrated into one processing unit, or each of the units may exist alone physically, or two or more units are integrated into one unit. The integrated unit may be implemented in a form of hardware, or may be implemented in a form of a software functional unit.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital STA line (DSL) or wireless technologies such as infrared ray, radio and microwave, the coaxial cable, optical fiber/cable, twisted pair, DSL or wireless technologies such as infrared ray, radio and microwave are included in a definition of a medium to which they belong. For example, a disk (Disk) and disc (disc) used by the present invention includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely exemplary embodiments of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:
1. A communications device, comprising a non-transitory memory storing instructions, wherein a processor of the communications device is configured to execute the instructions to cause the communications device to:
  acquire, from one or more space (S) regions, one or more beam identities fed back by one or more user equipment, wherein each beam in a cell corresponds to an S region of the one or more S regions;
  determine each time (T) region comprising a user equipment of the one or more user equipment according to the one or more beam IDs fed back by the one or more user equipment, and, for each T region, determine a quantity of user equipment comprised in the respective T region;

select, according to a preset rule, one or more to-be-connected user equipment from the user equipment comprised in each T region, and calculate, according to a preset resource allocation policy, a ratio of resources to be allocated to each to-be-connected user equipment; and allocate, in a preset allocation manner according to the ratio of resources, a respective resource to be allocated to each respective user equipment of the one or more to-be-connected user equipment, and send physical downlink control channel (PDCCH) information to each respective one or more to-be-connected user equipment to deliver the respective resource allocated to the respective one or more to-be-connected user equipment to the respective one or more to-be-connected user equipment.

2. The communications device according to claim 1, wherein the processor of the communications device is configured to execute the instructions to further cause the communications device to:

divide a to-be-scanned sector in the cell into multiple S regions, and divide each of the multiple S regions into at least one T region; and for each of the multiple S regions, poll all T regions in the respective S region in a time division manner by using a single beam, to cover each T region in the S respective region, and receive a beam ID of the one or more beam IDs fed back by the user equipment comprised in each T region, wherein each T region corresponds to one beam ID of the one or more beam IDs.

3. The communications device according to claim 2, wherein the processor of the communications device is configured to execute the instructions to further cause the communications device to:

determine, according to the one or more beam IDs fed back by the one or more user equipment, a respective T region in which each user equipment that fed back a respective beam ID of the one or more beam IDs is located; and determine the quantity of user equipment comprised in each T region according to one or more user equipment IDs fed back by the one or more user equipment.

4. The communications device according to claim 3, wherein the processor of the communications device is configured to execute the instructions to further cause the communications device to:

select, according to the preset rule, the one or more to-be-connected user equipment from the user equipment comprised in each T region; and a calculate, according to the preset resource allocation policy, the ratio of resources to be allocated to the one or more to-be-connected user equipment.

5. The communications device according to claim 4, wherein the processor of the communications device is configured to execute the instructions to further cause the communications device, for each T region, to:

when respective T region comprises only one user equipment, select the only one user equipment in the respective T region as user equipment of the one or more to-be-connected user equipment; or when the respective T region comprises a plurality of user equipment, select, according to preamble IDs fed back by the plurality of user equipment in the respective T region, one or more user equipment of the plurality of user equipment as user equipment of the one or more to-be-connected user equipment.

6. A base station, comprising:

a receiver, configured to acquire, from a one or more space (S) regions, one or more beam identities (IDs) fed back by one or more user equipment, wherein each beam in a cell corresponds to an S region of the one or more S regions;

a processor, configured to determine each time (T) region comprising a user equipment of the one or more user equipment according to the one or more beam IDs fed back by the one or more user equipment and acquired by the receiver, and, for each T region, determine a quantity of user equipment comprised in the respective T region;

wherein the processor is further configured to:

select, according to a preset rule, one or more to-be-connected user equipment from the user equipment comprised in each T region, and calculate, according to a preset resource allocation policy, a ratio of resources to be allocated to each to-be-connected user equipment; and allocate, in a preset allocation manner according to the ratio of resources, a respective resource to be allocated to each to-be-connected user equipment to the respective one or more to-be-connected user equipment; and a transmitter, configured to send physical downlink control channel (PDCCH) information to each respective one or more to-be-connected user equipment selected by the processor to deliver the respective resource allocated to the respective one or more to-be-connected user equipment to the respective one or more to-be-connected user equipment.

7. The base station according to claim 6, wherein the processor is further configured to:

divide a to-be-scanned sector in the cell into multiple S regions, and divide each of the multiple S regions into at least one T region; and wherein the transmitter is further configured to:

for each of the multiple S regions, poll all T regions in the respective S region in a time division manner by using a single beam, to cover each T region in the respective S region; and wherein the receiver is further configured to receive the one or more beam IDs fed back by the user equipment comprised in each T region, wherein each T region corresponds to one beam ID of the one or more beam IDs.

8. The base station according to claim 7, wherein the processor is further configured to:

determine, according to the one or more beam IDs fed back by the one or more user equipment and acquired by the receiver, a respective T region in which each user equipment that fed back a respective beam ID of the one or more beam IDs is located; and determine the quantity of user equipment comprised in each T region according to one or more user equipment IDs fed back by the one or more user equipment.

9. The base station according to claim 8, wherein the processor is configured to, for each T region:

when the respective T region comprises only one user equipment, select the only one user equipment as user equipment of the one or more to-be-connected user equipment; or when the respective T region comprises a plurality of user equipment, select, according to preamble IDs fed back by the plurality of user equipment in the respective T region, one or multiple user equipment as user equipment of the one or more to-be-connected user equipment.

10. The base station according to claim 9, wherein the processor is configured to, for each T region:
when the respective T region comprises a plurality of user equipment, and the preamble IDs fed back by the plurality of user equipment of the respective T region are different from each other, select all of the plurality of the user equipment of the respective T region as user equipment of the to-be-connected user equipment; or
when the respective T region comprises a plurality of user equipment, and the preamble IDs fed back by the plurality of user equipment of the respective T region are the same, select, according to a contention mechanism, one user equipment from the plurality of user equipment of the respective T region with the same preamble IDs as user equipment of the one or more to-be-connected user equipment.

11. A method, comprising:
acquiring, by a base station from one or more space (S) regions, one or more beam identities (IDs) fed back by one or more user equipment, wherein each beam in a cell corresponds to an S region of the one or more S regions;
determining each time (T) region comprising a user equipment of the one or more user equipment according to the one or more beam IDs fed back by the one or more user equipment, and determining a quantity of user equipment comprised in each T region;
selecting, by the base station according to a preset rule, one or more to-be-connected user equipment from the user equipment comprised in each T region, and calculating, according to a preset resource allocation policy, a ratio of resources to be allocated to each to-be-connected user equipment; and
allocating, by the base station in a preset allocation manner according to the ratio of resources, a respective resource to be allocated to each respective user equipment of the one or more to-be-connected user equipment, and sending physical downlink control channel (PDCCH) information to each respective one or more to-be-connected user equipment to deliver the respective resource allocated to the respective one or more to-be-connected user equipment to the respective one or more to-be-connected user equipment.

12. The method according to claim 11, wherein before acquiring the one or more beam IDs fed back by the one or more user equipment, the method comprises:
dividing, by the base station, a to-be-scanned sector in the cell into multiple S regions, and dividing each S region of the multiple S regions into at least one T region; and
for each of the multiple S regions, polling, by the base station, all T regions in the respective S region in a time division manner by using a single beam, to cover each T region in the respective S region, and receiving a beam ID of the one or more beam IDs fed back by the user equipment comprised in the T region, wherein each T region corresponds to one beam ID of the one or more beam IDs.

13. The method according to claim 12, wherein determining each T region comprising a user equipment of the one or more user equipment according to the one or more beam IDs fed back by the one or more user equipment, and determining a quantity of user equipment comprised in each T region comprises:
determining, by the base station according to the one or more beam IDs fed back by the one or more user equipment, a respective T region in which each user equipment that fed back a respective beam ID of the one or more beam IDs is located; and
determining, by the base station, the quantity of user equipment comprised in each T region according to one or more user equipment IDs fed back by the one or more user equipment.

14. The method according to claim 13, wherein selecting the one or more to-be-connected user equipment from the user equipment comprised in each T region comprises:
when respective T region comprises only one user equipment, selecting the only one user equipment in the respective T region as user equipment of the one or more to-be-connected user equipment; or
when the respective T region comprises a plurality of user equipment, selecting, according to preamble IDs fed back by the plurality of user equipment in the respective T region, one or more user equipment of the plurality of user equipment as user equipment of the one or more to-be-connected user equipment.

15. The method according to claim 14, wherein selecting the one or more user equipment of the plurality of user equipment as user equipment of the one or more to-be-connected user equipment comprises:
when the respective T region comprises the plurality of user equipment, and the preamble IDs fed back by the plurality of user equipment are different from each other, selecting all of the plurality of user equipment as user equipment of the to-be-connected user equipment corresponding to the T region; or
when the respective T region comprises the plurality of user equipment, and the preamble IDs fed back by the plurality of user equipment are the same, selecting, according to a contention mechanism, one user equipment from the plurality of user equipment with the same preamble IDs as user equipment of the to-be-connected user equipment corresponding to the T region.

* * * * *